United States Patent Office 2,750,513
Patented June 12, 1956

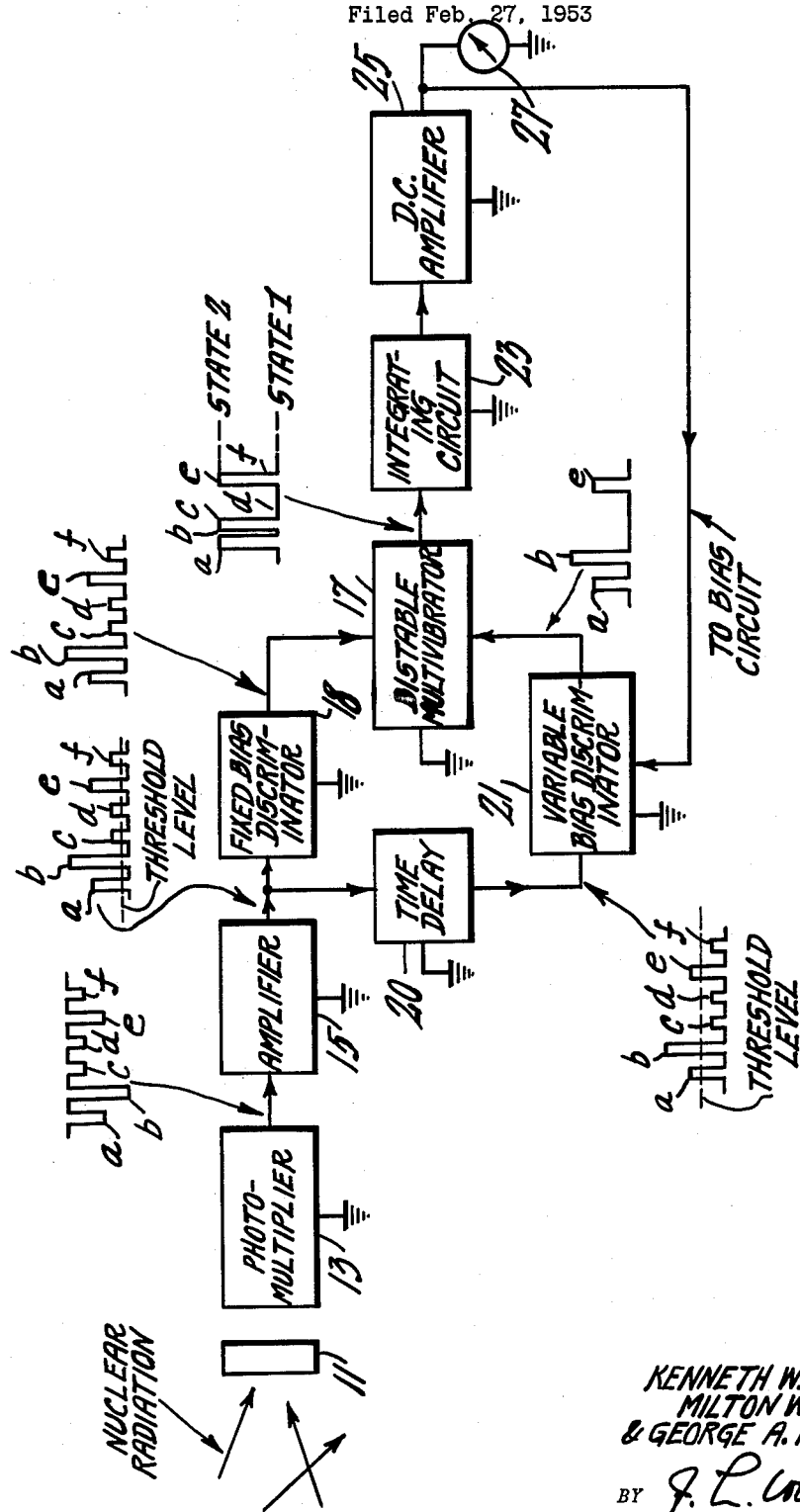

2,750,513

NUCLEAR RADIATION MEASURING INSTRUMENT

Kenneth W. Robinson, Milton W. Green, and George A. Morton, Princeton, N. J., assignors to Radio Corporation of America, a corporation of Delaware Application February 27, 1953, Serial No. 339,334

8 Claims. (Cl. 250—71)

This invention relates to apparatus for nuclear radiation measurements. Particularly it relates to apparatus for directly measuring and indicating the average "hardness" or average energy per particle of nuclear radiation.

Presently known methods and apparatus for ascertaining the hardness of nuclear radiations have some disadvantages. Some of the apparatus required to measure the energies of high energy nuclear particles or rays is complicated structurally, bulky, and expensive. Moreover such apparatus does not afford the advantages of providing a direct reading indication of radiation hardness. The methods of utilizing such apparatus often involve deriving large amounts of data for formulating tables and curves for subsequent analysis. One known energy measuring method of this type involves the utilization of a count rate circuit having a manually adjustable bias or threshold level. With the bias level set to a high threshold potential only particles having relatively high energies actuate the count rate equipment. At various lower threshold levels different greater numbers of nuclear particles may actuate the counter. By comparing the count rates at these different bias levels the numbers of particles having various energies may be determined and curves plotted from the data thus derived. The curves may then be used to determine the average energy of the nuclear radiation.

An object of the invention is to provide improved methods and means for measuring the particle energy of nuclear radiation.

Another object of the invention is to provide improved methods and means for measuring the average energy per particle or "hardness" of nuclear radiation.

A further object of the invention is to provide a direct reading instrument for measuring the hardness of nuclear radiation.

A still further object of the invention is to provide an instrument for measuring the hardness of nuclear radiation which is simple in structure and less expensive than presently known apparatus used for such measurement.

According to the present invention, the foregoing objects and advantages may be accomplished by a direct reading instrument for measuring the average energy per particle of nuclear radiation. The nuclear radiations first are converted into electrical pulses having a pulse height distribution with an average height proportional to radiation "hardness." The instrument operates by selecting a point on the pulse height distribution curve (for the particular material emitting the radiation) where the number of pulses that exceed this height is a constant fraction, for example, one-half, of the total number of pulses produced. The location of this point is independent of radiation intensity and generally is approximately a linear function of the hardness of the radiation.

The invention will be described in detail with reference to the accompanying drawing in which the single figure is a schematic diagram, in block form, of a nuclear energy measuring instrument according to the invention.

Referring to the drawing, a source (not shown) emits one or more types of high energy nuclear radiation such as alpha, beta, and gamma particles or rays. For the present example it will be assumed that cobalt$^{60}$, a gamma ray emitter, is the source of high energy radiation. Each particle or ray of such radiation which strikes a scintillation crystal 11 expends its energy in the crystal. The energy therein expended is converted into photon energy which is approximately proportional to the "hardness" (energy per particle) of the incident radiation. Suitable scintillation crystals in this example may comprise anthracene or sodium iodide crystals. Other types of scintillation crystals and phosphors may be employed when using or analysing radiation sources other than cobalt$^{60}$.

The scintillation crystal is positioned adjacent, and as close as possible to, the cathode of a photomultiplier device 13 so that most of the light photon energy produced by the crystal 11 initiates electron emission from the cathode. The electrons liberated in response to the incident light photon energy are amplified in successive dynode stages of the electron multiplier section of the device 13. The photomultiplier output comprises pulses having amplitudes which are proportional to the energy of each nuclear particle or gamma-ray photon causing the photoemission. The photomultiplier output may be further amplified, if desired, by means of an amplifier 15 which is coupled to the output circuit of the device 13.

The pulse output signals from the amplifier 15 simultaneously are applied to two signal channels. The first of these channels is coupled to one input circuit of a bistable multivibrator 17 and includes, for example, a fixed bias discriminator 18. The multivibrator 17 may be of the type illustrated at page 174( Figs. 4–8) of Ultra-High Frequency Techniques by Brainerd, Koehler, Reich, and Woodruff (D. Van Nostrand, 1946). Discriminator 18 may comprise a cathode-coupled double triode circuit or a biased amplifier circuit of the type shown at page 135 of the March 1951 issue of the Review of Scientific Instruments (circuitry associated with tube V–1) which is biased to a relatively low potential. The bias level is fixed so that pulses attributable to photomultiplier dark current signals, noise, and other undesired signals do not pass the bias threshold. Primarily only those pulses pass the discriminator which correspond to the occurrence of nuclear emissions. The second channel includes a time delay circuit 20 and a variable bias discriminator 21. The variable bias discriminator 21 also may be of the cathode-coupled amplifier or other type heretofore mentioned and has a variable threshold level which is more positive than the threshold level of discriminator 18. Discriminator 21 is coupled to the second input circuit of the bistable multivibrator 17.

The operation in response to a group of pulses (pulses *a, b, c, d, e,* and *f* shown at the output of amplifier 15) produced in response to the occurrence of nuclear phenomena is as follows: All the pulses corresponding to such phenomena are passed by the fixed bias discriminator 18 and are applied to one input circuit of the multivibrator 17. These pulses also are coupled into the second signal conveying channel wherein they are delayed in time delay circuit 20. The output of the delay circuit then is applied to the variable bias discriminator 21. Those pulses input to the discriminator 21 and having amplitudes sufficiently high to enable them to pass its threshold bias are applied to the second input circuit of multivibrator 17. In the present case it will be assumed that pulses *a, b,* and *e* pass the threshold of the variable bias discriminator.

With a given pulse appearing at the output of amplifier 15 having an amplitude sufficient to pass discriminator 18 but not discriminator 21, a pulse is applied to only one input circuit of the multivibrator thereby setting the multivibrator to one of its two stable conditions. This condition will be referred to as "state 1." When the pulse amplitude is greater and has an amplitude great enough to overcome the bias of both discriminators pulses are applied to both multivibrator input circuits and the multivibrator is set to the other of its two stable states. This condition will be referred to as "state 2." The time delay circuit 20 serves to provide a time delay for pulses conveyed in the variable bias channel so that the variable bias channel pulse remains applied to the multivibrator after the termination of the pulse in the fixed bias channel. The effect of this is to leave the multivibrator in state 2 when pulses are passed in both channels. This delay time is selected to be short compared to the average time between photomultiplier pulses. Thus with dual input signals the multivibrator will not be "undecided" as to which state it should be in.

The same effect as above may be achieved by omitting the delay line 20 and adjusting the discriminator 21 to provide output pulses having durations longer than that of pulses produced by the discriminator 18.

Consider the multivibrator operation in response to pulses *a* through *f*. It is assumed that the multivibrator initially is set to state 1. The amplitude of pulse *a* is great enough to enable the pulse to overcome the threshold bias of the variable bias discriminator. Since pulses *a* also passes the lower threshold of the fixed bias discriminator dual inputs are applied to multivibrator 17 and it is set to state 2. The next succeeding pulse, pulse *b*, also is of sufficient amplitude to overcome the threshold biases in both signal channels. In this case the multivibrator again is supplied with dual inputs. The device initially is set to state 1 by the fixed channel pulse and almost immediately thereafter set to state 2 by the variable channel pulse. The amplitude of pulse *c*, which is less than the amplitudes of pulses *a* and *b*, is such that it passes the fixed bias discriminator 18 but not the variable bias discriminator 21. With the resulting single input to the multivibrator the device is set to state 1. Pulse *d*, of substantially the same amplitude as pulse *c*, passes only the fixed bias channel and the multivibrator remains in state 1. At a later time pulse *e*, having a greater amplitude, is applied to both multivibrator inputs and the device is switched back to state 2. At a still later time pulse *f* occurs which passes the fixed but not the variable bias discriminator. The multivibrator is then again set to state 1. The average voltage appearing at one anode of the multivibrator is then a ratio of the numbers of pulses triggering the discriminators 18 and 21.

The output of the multivibrator is coupled to an integrating circuit 23, for example, a low pass filter, wherein the multivibrator voltage output is averaged. The integrating circuit 23 is designed to have a time constant which is long compared to the time interval between pulses corresponding to nuclear events. Preferably the averaged voltage is amplified in a D.-C. amplifier 25. The output of the D.-C. amplifier circuit is then fed back to the bias circuit of the variable bias discriminator. The feedback voltage automatically adjusts the bias of discriminator 21 so that a constant ratio of pulses triggers the two discriminators. In the present example this ratio is one-half. A voltmeter 27 or other suitable indicating device is connected to the output of the D.-C. amplifier 27 and may be calibrated to provide a direct reading of radiation hardness.

The foregoing arrangement thus essentially comprises two count rate circuits acting in opposition to each other for controlling the bistable states of the multivibrator. The bias potential applied to the variable phase discriminator is determined by the ratio of pulses triggering the two discriminators which, in turn, is determined by the energy per particle of high energy radiation producing the pulses.

The instrument is simple structurally, relatively inexpensive, and provides a direct reading of the average energy per particle of the radiation measured.

What is claimed is:

1. An electrical device comprising, a first count-rate circuit having a fixed bias threshold and for counting electrical pulses applied thereto, a second count-rate circut having a variable bias threshold and for counting electrical pulses applied thereto, a comparison circuit connected to said count-rate circuits for producing a voltage having an amplitude proportional to the ratio of counts of said circuits, and feed-back means for utilizing said voltage to control the variable bias of said second count-rate circuit.

2. An electrical device comprising, a first discriminator having a fixed bias threshold, a second discriminator having a variable bias threshold, a bistable counting circuit connected to said first and second discriminators for producing a voltage having an amplitude proportional to the ratio of the numbers of pulses passed by said discriminators, and feedback means for utilizing said voltage to control the variable bias of said second discriminator.

3. An instrument for measuring the average energy per particle of high energy nuclear radiations comprising, in combination, means for deriving electrical pulse signals having amplitudes proportional to the energies of different nuclear emissions, a first signal conveying channel coupled to said pulse deriving means for passing all of said pulses derived in response to said nuclear emissions, a second signal conveying channel coupled to said pulse deriving means and having a variable threshold bias for passing pulse signals having amplitudes greater than said threshold bias, means for utilizing pulse signals conveyed through said first and second signal channels for producing a direct-current voltage having an amplitude proportional to the ratio of pulses conveyed through said channels, and feedback means for applying said direct-current voltage to said second signal channel for automatically controlling said bias such that the ratio of pulses conveyed through said first and second signal channels is constant.

4. An instrument for measuring the average energy per particle of high energy nuclear radiations comprising, in combination, means for deriving electrical pulse signals having amplitudes proportional to the energies of different nuclear emissions, a first signal conveying channel coupled to said pulse deriving means for passing all of said pulses derived in response to said nuclear emissions, a second signal conveying channel paralleling said first signal channel and coupled to said pulse deriving means, said second channel being biased so that only those pulse signals having amplitudes great enough to overcome said bias pass through said second channel, means for utilizing signals conveyed through said first and second signal channels for producing a direct-current voltage having an amplitude proportional to the ratio of pulses conveyed through said channels, feedback means for applying said direct current voltage to said second signal channel for automatically controlling the bias of said channel such that the ratio of pulses conveyed through said first and second signal channels is constant, and an indicator coupled to said feedback means for providing an indication proportional to said feedback voltage.

5. An instrument for measuring the average energy per particle of high energy nuclear radiations comprising, in combination, a scintillation material for producing photon energy proportional to the energy of nuclear emissions incident on said material, means for deriving electrical pulse signals having amplitudes proportional to said photon energy, a first signal conveying channel coupled to said pulse deriving means for passing all of said pulses derived in response to said nuclear emissions, a second signal conveying channel coupled to said pulse deriving means and having a variable threshold bias for passing pulse signals having amplitudes greater than said threshold bias, means for utilizing pulse signals conveyed through said first and second signal channels for producing a direct-current voltage having an amplitude proportional to the ratio of pulses conveyed through said channels, and feedback means for applying said direct-current voltage to said second signal channel for automatically controlling said bias such that the ratio of pulses conveyed through said first and second signal channels is constant.

6. An instrument for measuring the average energy per particle of high energy nuclear radiations comprising, in combination, means for deriving electrical pulse signals having amplitudes proportional to the energies of different nuclear emissions, a first signal conveying channel coupled to said pulse deriving means for passing all of said pulses derived in response to said nuclear emissions, a second signal conveying channel coupled to said pulse deriving means and having a variable threshold bias for passing only signals having amplitudes greater than said threshold bias, a bistable multivibrator having separate input circuits coupled to said first and second signal channels, said multivibrator being set to a first stable condition with one input applied thereto and being set to a second stable condition with dual inputs applied thereto, means coupled to said multivibrator for producing a direct-current voltage having an amplitude proportional to the ratio of pulses conveyed through said channels, and feedback means for applying said direct-current voltage to said second channel for automatically controlling said variable bias such that the ratio of pulses conveyed through said first and second signal channels is constant.

7. An instrument for measuring the average energy per particle of high energy nuclear radiations comprising, in combination, a scintillation material for producing photon energy proportional to the energy of nuclear emissions incident on said material, means for deriving electrical pulse signals having amplitudes proportional to said photon energy, a first signal conveying channel coupled to said pulse deriving means for passing all of said pulses derived in response to said nuclear emissions, a second signal conveying channel coupled to said pulse deriving means and having a variable threshold bias for passing signals having amplitudes greater than said threshold bias, a bistable multivibrator having separate input circuits coupled to said first and second signal channels, said multivibrator being set to a first stable condition with one input applied thereto and being set to a second stable condition with dual inputs applied thereto, means coupled to said multivibrator for producing a direct-current voltage having an amplitude proportional to the ratio of pulses conveyed through said channels, feedback means for applying said direct-current voltage to said second channel for automatically controlling said variable bias such that the ratio of pulses conveyed through said first and second signal channels is constant, and an indicator coupled to said feedback means for providing an indication proportional to said feedback voltage.

8. A nuclear radiation measuring instrument as claimed in claim 7 wherein said direct-current voltage producing means includes an integrating circuit having a time-constant which is long compared to the time interval between pulses corresponding to said nuclear emissions.

References Cited in the file of this patent

UNITED STATES PATENTS

| | | |
|---|---|---|
| 2,548,449 | Staub | Apr. 10, 1951 |
| 2,610,303 | Bell | Sept. 9, 1952 |
| 2,636,993 | Jakobson | Apr. 28, 1953 |
| 2,642,527 | Kelley | June 16, 1953 |
| 2,685,027 | Alvarez | July 27, 1954 |